(12) United States Patent
Cewers

(10) Patent No.: US 9,048,757 B2
(45) Date of Patent: Jun. 2, 2015

(54) DRIVER CIRCUIT AND METHOD FOR CONTROLLING A CAPACITIVE ELEMENT

(75) Inventor: Göran Cewers, Limhamn (SE)

(73) Assignee: MINDRAY MEDICAL SWEDEN AB, Sundbyberg (SE)

( * ) Notice: Subject to any disclaimer, the term of this patent is extended or adjusted under 35 U.S.C. 154(b) by 725 days.

(21) Appl. No.: 13/108,308

(22) Filed: May 16, 2011

(65) Prior Publication Data

US 2011/0285330 A1 Nov. 24, 2011

Related U.S. Application Data

(60) Provisional application No. 61/345,764, filed on May 18, 2010.

(51) Int. Cl.
*H02N 2/00* (2006.01)

(52) U.S. Cl.
CPC .................................. *H02N 2/0075* (2013.01)

(58) Field of Classification Search
CPC ....... H02N 2/0075; H02N 2/06; H02N 2/065; H02N 2/14; H02N 2/145
USPC .......................................................... 310/317
See application file for complete search history.

(56) References Cited

U.S. PATENT DOCUMENTS

| 5,691,592 | A | 11/1997 | Gunderson et al. |
| 6,617,754 | B1 | 9/2003 | Knauss |
| 7,667,371 | B2 * | 2/2010 | Sadler et al. .................. 310/317 |
| 2009/0172453 | A1 * | 7/2009 | Dishman et al. .............. 713/340 |

FOREIGN PATENT DOCUMENTS

| FR | 2829314 A1 | 3/2003 |
| WO | 03038918 A2 | 5/2003 |

* cited by examiner

*Primary Examiner* — Derek Rosenau
(74) *Attorney, Agent, or Firm* — Kory D. Christensen; Stoel Rives LLP

(57) ABSTRACT

The disclosure pertains to a method of charging or discharging a capacitive element, such as a piezoelectric crystal. The disclosure also pertains to a device that implements charging of a capacitive element according to said method. The device comprises a bipolar buck-boost converter, whereby a capacitive element can be charged with both positive and negative voltages. The discharge of the capacitive element is provided with energy recovery and feedback to the device's power supply.

11 Claims, 3 Drawing Sheets

DRIVER CIRCUIT AND METHOD FOR CONTROLLING A CAPACITIVE ELEMENT

CROSS-REFERENCE TO RELATED APPLICATION(S)

This application claims the benefit of U.S. Provisional Application No. 61/345,764, filed May 18, 2010, which is incorporated herein by reference.

TECHNICAL FIELD

The disclosure relates to a driver circuit and a procedure for controlling a capacitive element. More specifically, the disclosure relates to a bipolar buck-boost regulator for driving at least one piezo actuator.

SUMMARY OF THE INVENTION

A driver circuit and method for controlling a capacitive element, such as a piezoelectric crystal, are disclosed.

DETAILED DESCRIPTION

Figure 1:
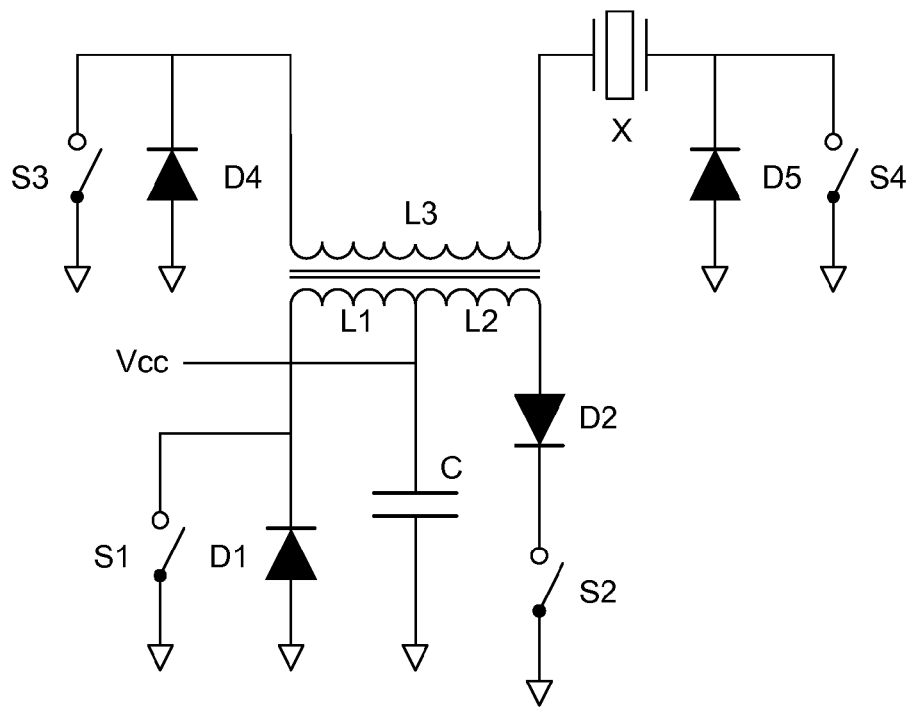
FIG. 1 shows a schematic view of an exemplary embodiment of an electrical circuit.

As new technological advances are made in the field of piezoelectric ceramics, piezo actuators are increasingly replacing electromagnetic actuators. Piezo ceramic technology enables the manufacture of actuators with considerably faster response times and considerably lower energy consumption. However, the use of this technology brings with it other technological challenges. One of these is the electrical control of piezo actuators.

Piezo actuators require voltages of up to 1000V so that they can be actuated to their entire range. However, with modern ceramic multi-layer technology, these voltages have been successfully brought down to the 100V range, a considerable reduction, but still a high voltage to manage, especially for electronics systems used today, which normally work at considerably lower voltages. The use of high voltages also involves risks for users of devices, especially in the field of medical applications.

In its construction, a piezoelectric actuator is very similar to a ceramic multilayer capacitor, and the combination of relatively large capacitance and high voltages provides for considerable amounts of energy being storable in these actuators. The advantage of this stored energy is that the actuator state is retained if the electrical connection is cut, and thus no energy is needed to maintain the state. However, the drawback is that stored energy must be dealt with if the actuator is to be controlled back to a lower movement amplitude. In linear control applications, this involves a great deal of this energy being lost for generating heat. Yet another issue is that the piezo ceramic structure is subject to inherent friction, which means that piezo actuators are subject to mechanical hysteresis of approximately 20% magnitude. Therefore, in order not to lose motion, one can supply the actuator with a negative voltage of approximately 20% of the normal positive control voltage. The actuator should not be supplied with more negative voltages exceeding 20% of the maximum positive voltage, since this can destroy it.

One method for avoiding many of the aforementioned issues is by means of a switching technique in combination with an inductor. The stored energy in the power supply unit can then be switched back to the actuator. A number of solutions of this kind are described in U.S. Pat. No. 6,617,754, where switching is performed by a single inductor element against a high voltage source with a central outlet. However, the disadvantage of this type of solution is that the device needs a double high voltage source with voltages in the range of 100V or more.

The present disclosure includes devices and methods to enable switched energy recovery control of a capacitive element without using a high voltage source. This is achieved by means of a capacitive element acting as a capacitor in the end stage of a boost regulator. By adding extra switch functions and by using a transformer with several windings, the boost regulator can be combined with a buck regulator to provide charging of the capacitive element with energy recovery.

Embodiments include a method of charging or discharging a capacitive element, such as a piezoelectric crystal. A device charges a capacitive element according to this method. In various embodiments, the device comprises a bipolar buck-boost converter, whereby a capacitive element can be charged with both positive and negative voltages. The capacitive element is discharged with the abovementioned energy recovery and feedback to the device power supply in certain embodiments.

In one aspect of the disclosure, a driver circuit is provided, which is configured to control a capacitive element. The driver circuit comprises a combined switched boost regulator circuit and a switched buck regulator circuit, as well as a plurality of change-over switches. In one embodiment, the driver circuit has two operative states, which are selectable using the abovementioned change-over switches, wherein one operative state is a boost regulator and the other operative state is a buck regulator.

According to various embodiments, the abovementioned change-over switches comprises at least four switches, of which a first primary switch S1 and a second primary switch S2 are arranged on a primary side, and a first secondary switch S3 and a second secondary switch S4 are arranged on a secondary side.

In some embodiments, the driver circuit comprises at least one transformer, which, on the primary side, may have at least two windings L1 and L2.

The operative states may be obtained as follows:
- by opening the second primary switch S2 and the first secondary switch S3, and connecting the second secondary switch S4, thus providing a positive boost converter, which is controlled by the first primary switch S1 for positive charging of the capacitive element X;
- by opening the first primary switch S1 and the second secondary switch S4 and connecting the first secondary switch S3, thus providing a negative boost converter, which is controlled by the second primary switch S2 for negative charging of capacitive element X;
- by opening the first primary switch S1 and the second primary switch S2 and connecting the second secondary switch S4, thus providing a positive buck converter, which is controlled by the first secondary switch S3 for discharging of the capacitive element X and feedback to a tank capacitor C.

In another embodiment, the capacitive element X is grounded on one side, both the secondary switches S3 and S4 are placed on one side of the inductor's secondary winding L3, and a diode D2 is arranged between the second primary switch S2 and the primary inductor winding L2.

In one embodiment, clamping effects may be avoided upon negative boosting by means of adding an extra diode D3.

The circuit is built to drive capacitive elements, such as an actuator element (e.g., a piezo actuator). In one embodiment, the circuit is built with a boost regulator combined with a buck regulator by using an inductance/coil of the transformer with more windings on the primary side and extra switches. Using this structure, the driver circuit can control the capacitive element by charging with either positive or negative voltages by switching the circuit to either a positive boost converter or a negative boost converter.

The capacitive element can also be discharged by switching the circuit to a positive buck converter, which discharges with energy recovery and feedback to the device power supply. This means that the energy accumulated in the actuator that would otherwise be lost as heat when an actuator is controlled to a lower deflection is not lost.

Using this driver circuit structure, the negative control range to the actuator is also restricted. This means that when the driver circuit is used to control the actuator with a negative voltage, so as not to lose movement due to mechanical hysteresis, it is not possible to control the circuit at such high negative voltages that the actuator is destroyed. This limit on actuator capacity is in the range of 20% of the maximum permitted positive voltage.

In one embodiment, the switches are MOS transistors, but skilled artisans will recognize that other types of switches may be used.

In a second aspect, the disclosure includes a method for driving and controlling capacitive elements. The method comprises providing a combined switched boost regulator circuit and a switched buck regulator circuit, as well as a number of change-over switches, and providing two optional operative states by controlling these change-over switches, wherein one operative state is a boost regulator and the other is a buck regulator.

In some embodiments, the boost regulator is used at negative and positive voltages to charge the capacitive element, such as an actuator element (e.g., piezo actuator), and the buck regulator is used to discharge the capacitive element by energy recovery and feedback to the driver circuit power supply.

In some embodiments, a negative control range for the actuator is limited, e.g., to a range of 20% of the maximum permitted positive voltage.

Accordingly, a capacitive element, such as an actuator element (e.g., piezo actuator) can be driven both with positive and negative voltages and be discharged without the energy accumulated in the actuator being lost, e.g. as heat, but can be recovered by feedback to the device power supply.

FIG. 1 shows a schematic view of an exemplary embodiment of an electrical circuit. In one embodiment, the transformer has winding ratios N1 and N2 on the primary side, and N3 on the secondary side.

Figure 2:
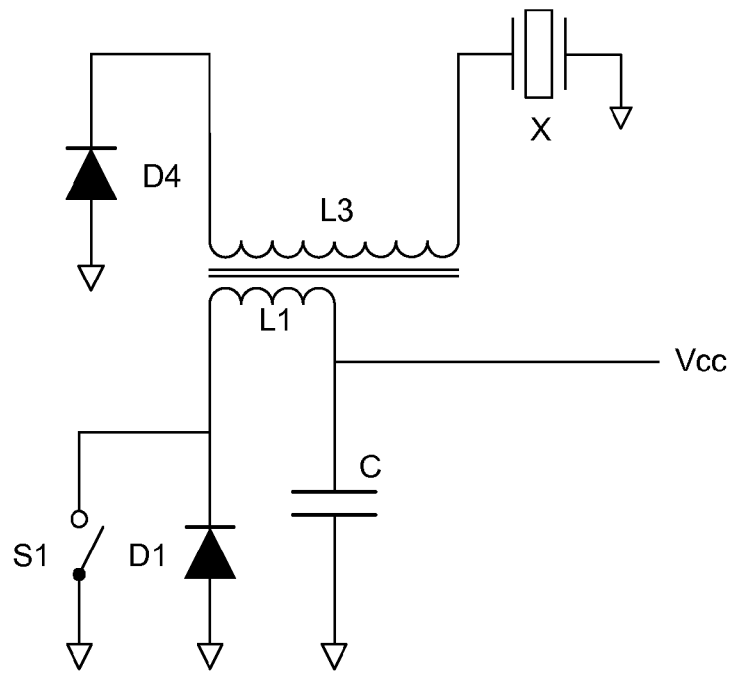
FIG. 2 shows a schematic view of an electrical circuit equivalent to that shown in FIG. 1, connected as a positive boost converter.

FIG. 2 shows a schematic view of an electrical circuit equivalent to that shown in FIG. 1, where S2 and S3 are open, and S4 is closed. In this configuration the circuit is operative as a positive boost converter. Energy is switched by means of S1 from Vcc and the tank capacitor C.

Figure 3:
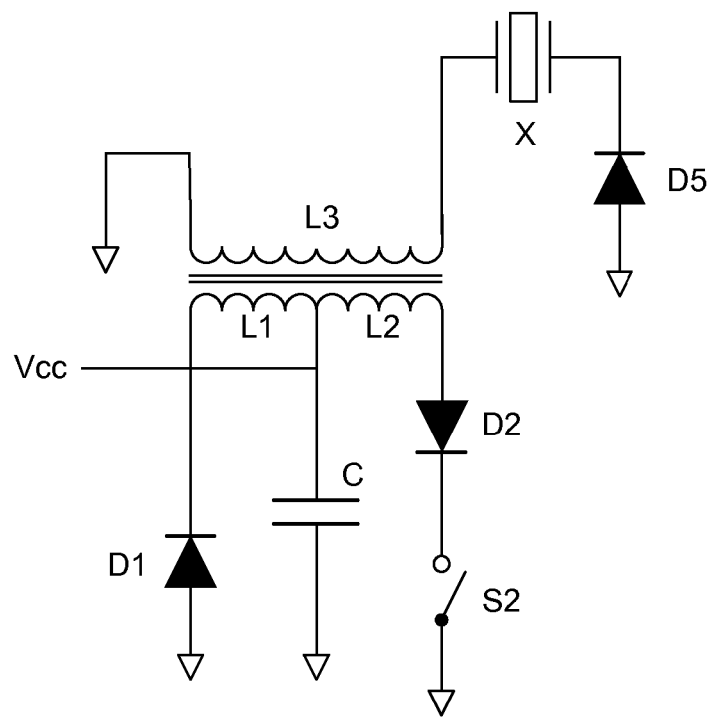
FIG. 3 shows a schematic view of an electrical circuit equivalent to that shown in FIG. 1, connected as a negative boost converter.

FIG. 3 shows a schematic view of an electrical circuit equivalent to that shown in FIG. 1, where S1 and S4 are open and S3 is closed. In this configuration, the circuit acts as a negative boost converter. Energy is switched with the help of S2 from Vcc and tank capacitor C. Diode D1, together with the transformer's winding ratio, limits the controllable negative voltage to the capacitive element to the required fraction of Vcc.

Figure 4:
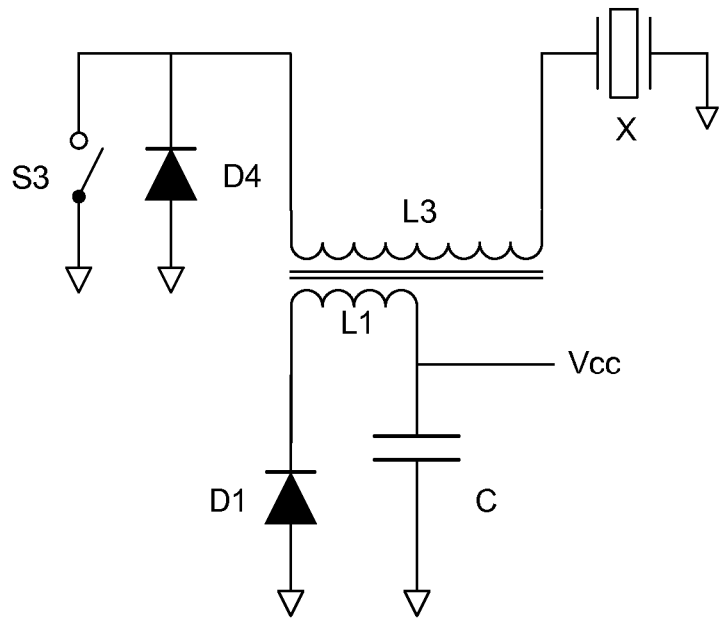
FIG. 4 shows a schematic view of an electrical circuit equivalent to that shown in FIG. 1, connected as a positive buck converter.

FIG. 4 shows a schematic view of an electrical circuit equivalent to that shown in FIG. 1, when S1 and S2 are open and S4 is closed. In this configuration, the circuit is operative as a positive buck converter. Energy is switched by means of S3 from the capacitive element X to the tank capacitor C.

Figure 5:
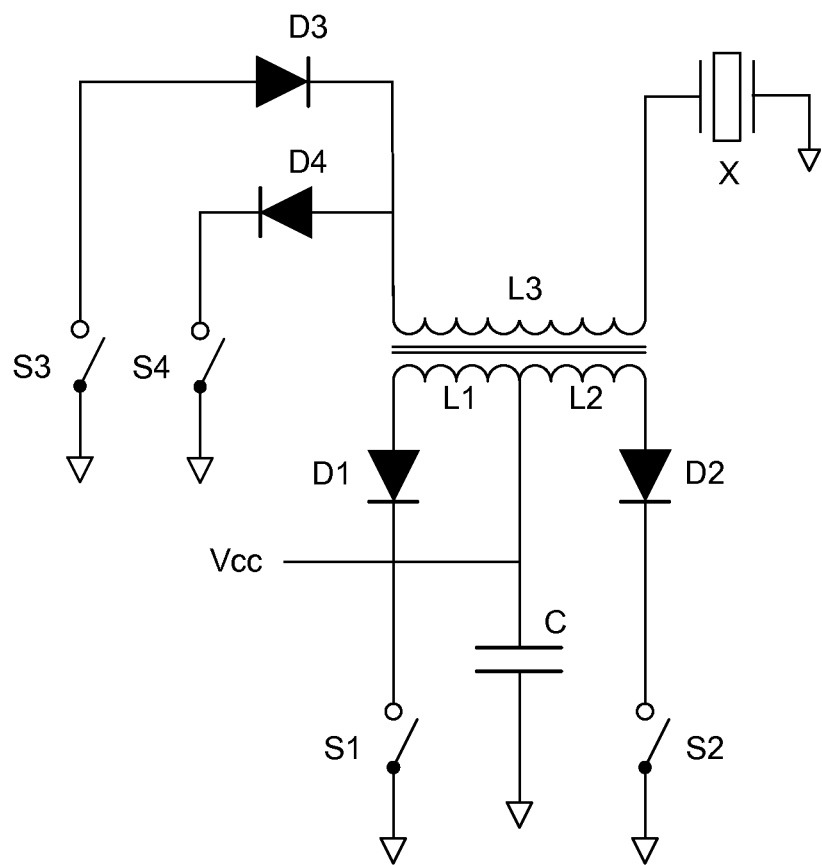
FIG. 5 shows a schematic view of another exemplary embodiment of an electrical circuit.

FIG. 5 shows a schematic view of yet another exemplary embodiment of an electrical circuit. The capacitive element X may be grounded on one side, and the switches S3 and S4 may be arranged on one side of the inductor's secondary winding L3. Furthermore, a diode D3 may be added. D3 prevents the abovementioned clamping effect upon negative boost, which means that high negative voltages can be generated when D3 is included in the circuit.

No connections for dealing with transients caused by shared inductance between the cooperating windings in the transformer are included in the abovementioned circuit examples. However, a skilled artisan will be able to implement such connections using known technology.

Description of Positive Boost

This process is active when a voltage Vcc is to be converted from a limited negative voltage to a high positive voltage across the crystal X. S2 and S3 are open, and S4 is closed in this operational state. The functional parts of the circuit in this operational state are described in FIG. 2. FIG. 2 shows a schematic view of this equivalent to the electrical circuit shown in FIG. 1, wherein S2 and S3 are open and S4 is closed.

1. When S1 is closed, the current is ramped up in L1. The field in the transformer core builds up to a positive field value. During this time, the voltage towards the diode D4 is Vcc*N3/N1, and there is no current flowing through D4 or X.

2. S1 opens and the field in the transformer core drops towards zero. The voltage over D4 drops immediately until it starts to conduct, approx. −0.6V, and a current flows through D4, L3 and X, so that the voltage across X in a number of cycles is gradually ramped up to a high voltage of, e.g., 120V. The voltage across D1 will rise across Vcc at each cycle, and no current flows through L1.

3. S1 is connected again, and so on.

Description of Negative Boost

This process is active when a voltage Vcc is to be converted from zero to a limited negative voltage across the crystal X. S1 and S4 are open, and S3 is closed in this operational state. The functional parts of the circuit in this operational state are described in FIG. 3. FIG. 3 shows a schematic view of this equivalent to the electrical circuit shown in FIG. 1, wherein S1 and S4 are open and S3 is closed.

1. When S2 is closed, the current is ramped up in L2. The field in the transformer core builds up to a negative field value. During this time the voltage towards diode D1 is Vcc and there is no current flowing through D1. The voltage to diode D5 also becomes positive and no current flows through L3, D5, or X.

2. S2 opens and the field in the transformer core rises towards zero. There are then two competing processes: a boost via L3 generates a negative voltage across X, or a boost across L1, which ramps energy stored in the transformer back to C and supply voltage Vcc. The active boost process is determined by the voltage across the capacitive element (the piezo crystal) X, Vcc and the transformer ratio N3:N1. In practice, this means that the negative boost is limited to −Vcc*N3/N1. If Vcc=12V and N3:N1 is 5:3, the maximum voltage across X is −20V.

3. S2 is closed again, and so on.

Description of Positive Buck

This process is active when crystal X is to be discharged, i.e., the voltage drops towards zero. S1 and S2 are open, and S4 is closed in this operational state. The functional parts of the circuit in this operational state are described in FIG. 4. FIG. 4 shows a schematic view of this equivalent to the electrical circuit as shown in FIG. 1, where S1 and S2 are open and S4 is closed.

1. When S3 is closed, the current is ramped from X up in L3. The field in the transformer core builds up to a negative field value. During this time, the voltage towards diode D1 is positive, and there is no current flowing through D1. The crystal X is gradually discharged in this phase.

2. S3 opens and the field in the transformer core drops towards zero. The voltage across D1 immediately drops until it starts to conduct, approximately −0.6V, and a current flows through D1, L1, and C so that energy from crystal X is fed back to C and Vcc.

3. S3 is connected again, and so on.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. The scope of the invention is, therefore, defined by the following claims. The words "including" and "having," as used herein, including in the claims, shall have the same meaning as the word "comprising."

What is claimed is:

1. A driver circuit configured to control a capacitive element, comprising
    a switched boost regulator circuit and a switched buck regulator circuit;
    a plurality of change-over switches;
    a transformer comprising at least two windings on a primary side of the transformer and at least one winding on a secondary side of the transformer; and
    a tank capacitor on the primary side of the transformer;
    wherein the driver circuit has two operative states that are selectable by said change-over switches, wherein a first operative state is a boost regulator and a second operative state is a buck regulator.

2. The driver circuit for controlling a capacitive element according to claim 1, wherein:
    said change-over switches comprise at least four switches, of which a first primary switch and a second primary switch are arranged on a primary side of the transformer, and a first secondary switch and a second secondary switch are arranged on a secondary side of the transformer; and
    said operative states are obtained by opening or closing said first primary switch and said second primary switch, as well as said first secondary switch and said second secondary switch, in different configurations.

3. The driver circuit according to claim 1, wherein said operative states are obtained as follows: by opening the second primary switch and the first secondary switch and connecting the second secondary switch, a positive boost converter is provided which is controlled by the first primary switch for positive charging of the capacitive element; by opening the first primary switch and the second secondary switch and connecting the first secondary switch, a negative boost converter is provided, which is controlled by the second primary switch for negative charging of the capacitive element; by opening the first primary switch and the second primary switch and connecting the second secondary switch, a positive buck converter is provided, which is controlled by the first secondary switch for discharging of the capacitive element and feedback to a tank capacitor.

4. The driver circuit according to claim 2, wherein the capacitive element is grounded on one side; both secondary switches are placed on one side of the transformer's secondary winding; and a diode is arranged between the second primary switch and the primary transformer winding.

5. The driver circuit according to claim 1, in which the at least two windings of the transformer constitute as an energy storage element for the driver circuit.

6. The driver circuit according to claim 1, wherein the driver circuit is configured to controllably supply positive voltages to the capacitive element by controlling the switching of the first primary switch and the second primary switch.

7. The driver circuit according to claim 1, wherein the driver circuit is configured to controllably supply negative voltages to the capacitive element using the first primary switch or the second primary switch.

8. The driver circuit according to claim 7, wherein a negative control range to the capacitive element is limited.

9. The driver circuit according to claim 1, wherein the capacitive element is an actuator element.

10. The driver circuit according to claim 9, wherein the actuator element is a piezoelectric actuator.

11. The driver circuit according to claim 1, wherein at least one of the change-over switches is a MOS transistor.

* * * * *